(12) United States Patent
Inoue et al.

(10) Patent No.: US 7,577,349 B2
(45) Date of Patent: Aug. 18, 2009

(54) FOCUS DETECTING DEVICE AND CAMERA SYSTEM USING THE SAME DEVICE

(75) Inventors: Daisuke Inoue, Ebina (JP); Hidekazu Takahashi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 474 days.

(21) Appl. No.: 11/499,719

(22) Filed: Aug. 7, 2006

(65) Prior Publication Data
US 2007/0047939 A1    Mar. 1, 2007

(30) Foreign Application Priority Data
Aug. 31, 2005    (JP)    ............................... 2005-251656

(51) Int. Cl.
*G03B 7/28*    (2006.01)
(52) U.S. Cl. ........................ 396/111; 348/345; 348/350
(58) Field of Classification Search .................. 396/79, 396/80, 96, 111, 121, 124; 348/345, 349, 348/350
See application file for complete search history.

(56) References Cited

U.S. PATENT DOCUMENTS

| | | | | |
|---|---|---|---|---|
| 5,262,820 A * | 11/1993 | Tamai et al. | ................... | 396/54 |
| 5,995,144 A * | 11/1999 | Sasakura | ..................... | 348/350 |
| 6,643,460 B2 * | 11/2003 | Uchiyama et al. | ........... | 396/114 |
| 6,704,051 B1 | 3/2004 | Takahashi | .................... | 348/315 |
| 6,766,112 B2 * | 7/2004 | Kuwata et al. | .............. | 396/114 |
| 6,803,614 B2 | 10/2004 | Takahashi | .................... | 257/292 |
| 6,816,199 B1 * | 11/2004 | Ide | .............................. | 348/350 |
| 6,924,841 B2 * | 8/2005 | Jones | ......................... | 348/294 |
| 7,164,447 B2 | 1/2007 | Takahashi | .................... | 348/350 |
| 2001/0022626 A1 * | 9/2001 | Nozaki | ........................ | 348/345 |
| 2003/0059216 A1 * | 3/2003 | Takahashi | ................... | 396/121 |
| 2003/0164935 A1 * | 9/2003 | Kanemitsu | .................. | 356/3.14 |
| 2004/0008983 A1 * | 1/2004 | Kanemitsu | ................... | 396/96 |
| 2006/0045506 A1 | 3/2006 | Takahashi | .................... | 396/96 |
| 2006/0077282 A1 * | 4/2006 | Kido et al. | .................. | 348/362 |
| 2006/0139478 A1 * | 6/2006 | Nozaki | ....................... | 348/345 |

FOREIGN PATENT DOCUMENTS

| | | |
|---|---|---|
| JP | 11-19867 | 1/1999 |
| JP | 2005-109370 | 4/2005 |

* cited by examiner

*Primary Examiner*—W B Perkey
*Assistant Examiner*—Warren K Fenwick
(74) *Attorney, Agent, or Firm*—Fitzpatrick, Cella, Harper & Scinto

(57) ABSTRACT

Although an area type focus detecting device for performing phase difference detection type multi point autofocus is used for high speed high precision autofocus of multi points in a wide region, there is a problem of cost increase due to the increase of the chip area. In accordance with the present invention, the photoreceiving area of a specific pixel in an area sensor is made larger than the photoreceiving area of other pixels in the same area sensor. Thus, because the sensor sensitivity is improved and the increase of the chip area is suppressed to a minimum level, a low cost high precision area type focus detecting device can be provided.

5 Claims, 3 Drawing Sheets

FOCUS DETECTING DEVICE AND CAMERA SYSTEM USING THE SAME DEVICE

BACKGROUND OF THE INVENTION

1. Field of the Invention

The present invention relates to a device for performing phase difference detection type autofocus. Particularly, the present invention relates to a focus detecting (hereinafter also referred to as AF) optical device (AF sensor) used in a digital camera or an analog (silver halide) camera or the like.

2. Description of the Related Art

FIG. 2 shows a layout of a focus detecting optical device for performing conventional area type phase difference detection type autofocus. This area type phase difference detection type AF sensor is disclosed in Japanese Patent Application Laid-Open No. H11-019867 and Japanese Patent Application Laid-Open No. 2005-109370 which are both commonly assigned with the present application.

In FIG. 2, a chip is formed on the same semiconductor substrate by using a CMOS process or the like, and is composed of a sensor circuit block 201, an analog circuit block 202, and a digital circuit block 203. Each of the pixels of area sensors 204, 205, 206 and 207 has a photoelectric conversion element such as a photo diode, and an imaging region for capturing an image of an object is formed by arranging these pixels in a two dimensional manner. Because the phase difference detection type AF sensor performs focus detection by detecting a phase difference between two objects, imaging regions including an A image (standard portion) and a B image (reference portion) are required.

The B image of the area sensor 1' 205 is placed symmetrically to the A image of the area sensor 1 204 relative to a vertical line which passes through an optical center 214 (also referred to as a center of the sensor). The B image of the area sensor 2' 207 is also placed symmetrically to the A image of the area sensor 2 206 relative to a horizontal line which passes through the optical center 214. The number of pixels and the pixel size of the area sensor 1 are same as those of the area sensor 1'. The pixel size is 13.6 um×101.6 um, and the pixels are arranged in an array of 56 pixels×18 rows. The number of pixels and the pixel size of the area sensor 2 are same as those of the area sensor 2'. The pixel size is 13.6 um×73.6 um, and the pixels are arranged in an array of 45 pixels×42 columns. In addition, reference number 208 in the analog circuit block denotes an AGC circuit for automatically controlling the gain of a signal output circuit based on an accumulation period of the AF sensor. Reference numeral 209 denotes a signal amplifying circuit for amplifying a photoelectric conversion signal of the AF sensor to output. Further, reference numeral 210 denotes a power supply circuit for generating a reference voltage required to drive the sensor. Furthermore, reference numeral 211 in the digital circuit block denotes a SRAM for holding the accumulation period information, a gain setting value and the like of the AF sensor. Reference numeral 212 denotes a multiplexer circuit for selecting an analog signal to output for monitoring, and reference numeral 213 denotes a timing generator and I/Os.

Although the above mentioned focus detecting optical device for performing phase difference detection type autofocus is used for multi detection point high speed high precision autofocus in a wide region, there appears a problem of the cost increase due to the increase of the chip area. This is a problem specific to the area type AF sensor, which problem has not appeared in a line type AF sensor in which there is the small number of pixels and which has relative free arrangement in the case where the pixel area is increased. In FIG. 2, for example, a case that autofocus performance is increased under a low (dark) intensity condition is supposed. In this case, if the respective areas of the photo diodes in the area sensor 1 and the area sensor 1' are uniformly increased for the purpose of improving the sensitivity, these sensors do not fit into the current chip, thus increasing the chip area. Therefore, the cost of the focus detecting optical device has been increased and these devices have not been put into practical use.

SUMMARY OF THE INVENTION

In order to solve above problems, the present invention is characterized in that pixels having different photoreceiving area in the same pixel area are provided. Specifically, the photoreceiving area of a pixel in a specific column is made larger than the photoreceiving area of a pixel in another column. The pixels having large photoreceiving area will improve the sensitivity by forming pixel pairs for performing phase difference detection while suppressing the increase of the chip area to a minimum level. The present invention is also characterized in that pixel area is increased only in a vertical direction by using a common pixel pitch in a horizontal direction in order to improve the relative precision of a peripheral circuit such as a transfer circuit in the vertical and horizontal directions from a view point of layout. In addition, the present invention is characterized in that the pixel area of the pixels in one or more columns, which are most frequently used and are in contact with a line passing through an optical center, is increased. In other words, it is characterized in that the pixels which perform focus detection of points being spatially located at the most central position among multi focus detection points correspond to the pixels having the large photoreceiving area mentioned above.

As described above, in accordance with the present invention, in the same region of each area sensor of a standard portion of pixel area and a reference portion of pixel area, the photoreceiving area of a pixel in a specific column or a specific row is increased compared to that of a pixel in the other columns or the other rows. In addition, the pixels having the large photoreceiving area form the pixel pairs for performing phase difference detection. In other words, the pixels are used to detect the same focal point. Therefore, because the sensor sensitivity is improved and the increase of the chip area is suppressed to a minimum level, a low cost high precision AF sensor can be provided.

Further features of the present invention will become apparent from the following description of exemplary embodiments with reference to the attached drawings.

DESCRIPTION OF THE EMBODIMENTS

Figure 1:
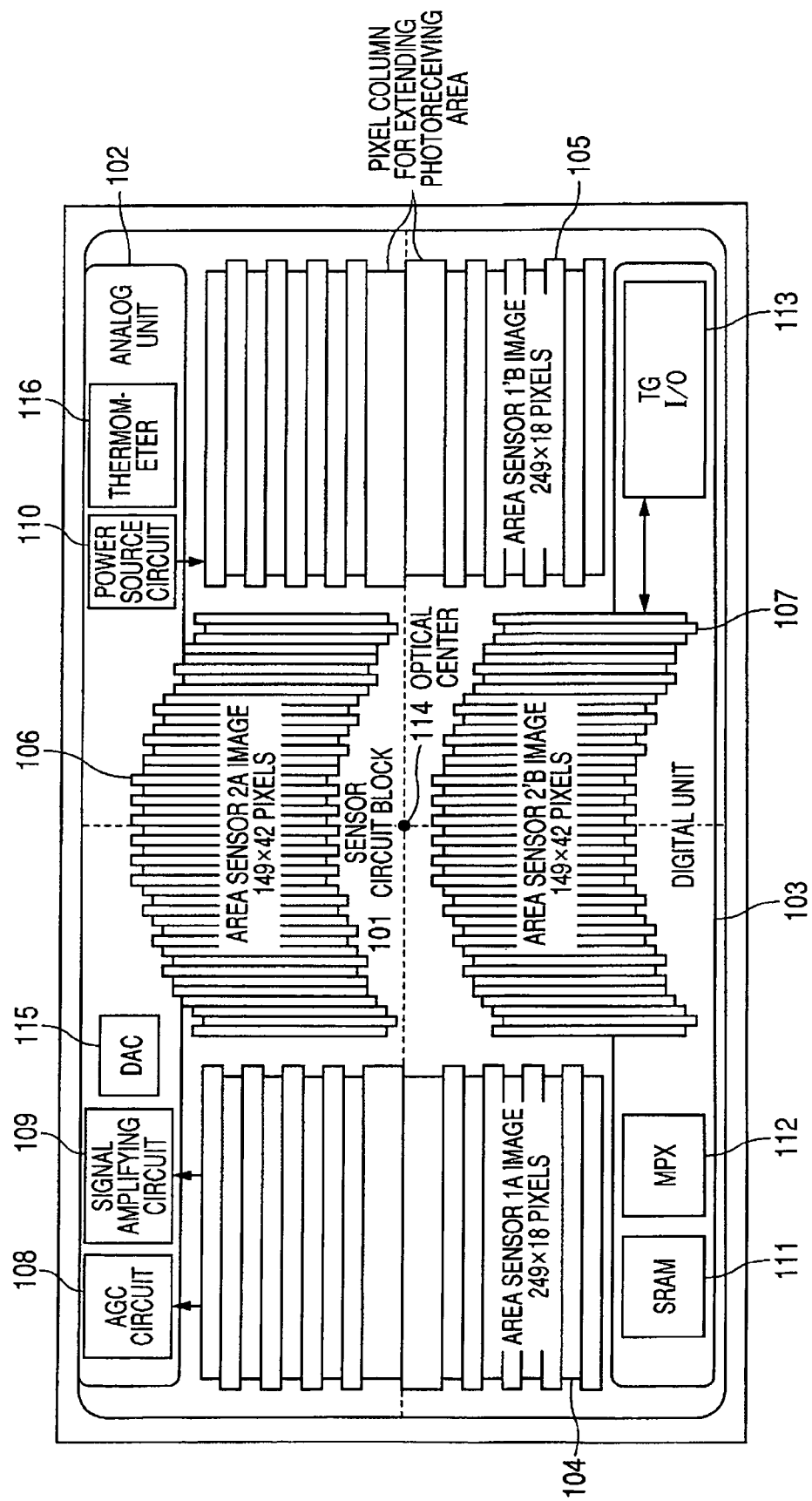
FIG. 1 is an exemplary diagram showing a first embodiment in accordance with the present invention.
Figure 2:
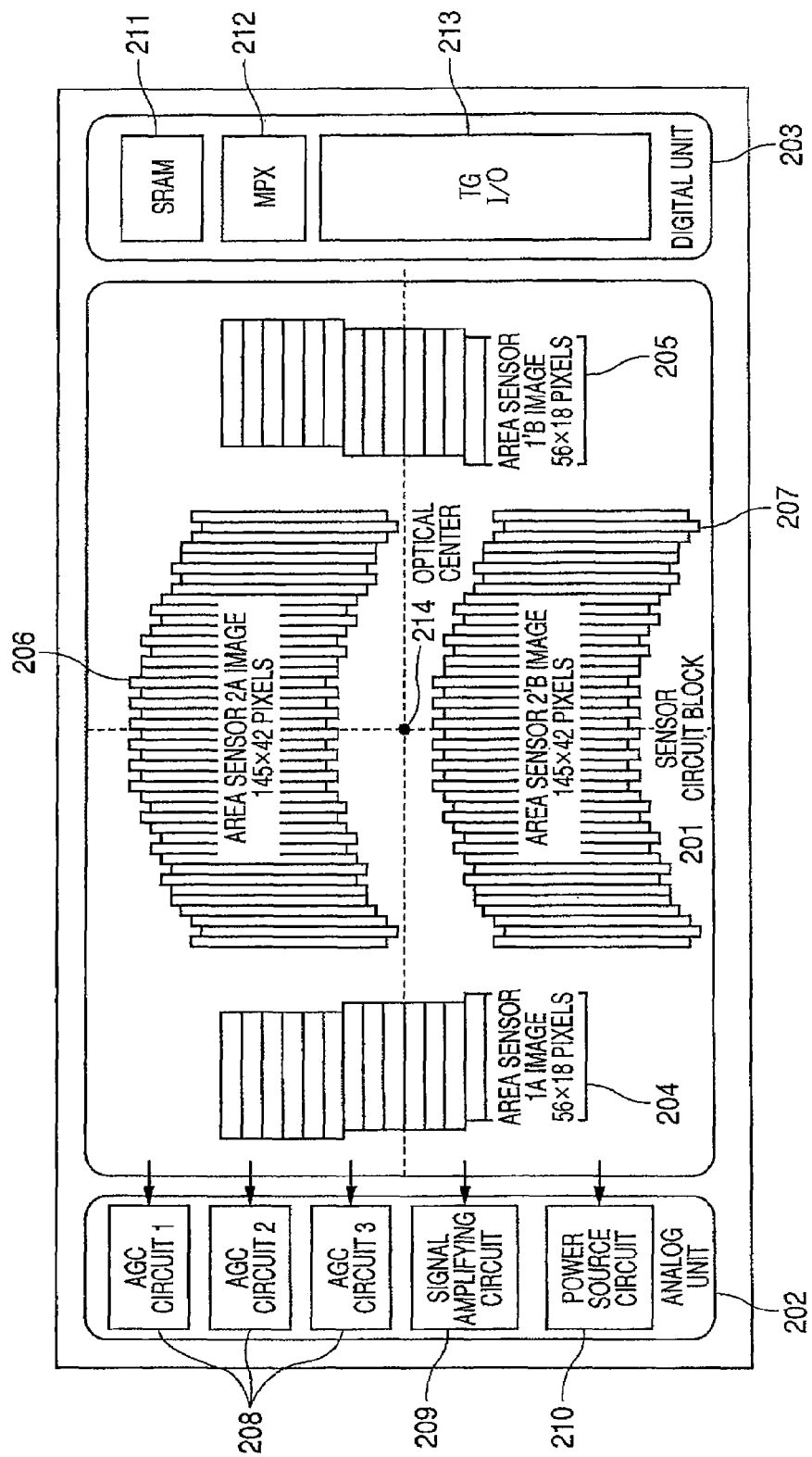
FIG. 2 is a block diagram showing a prior art example.

Embodiments in accordance with the present invention will now be described in detail below by referring to the drawings.

Note that although the respective embodiments described below are suitable specific examples in accordance with the present invention and are subjected to a variety of technologically preferred limitations, the technological scope of the present invention is not limited to these embodiments.

First Embodiment

FIG. 1 is a schematic diagram for illustrating an embodiment in accordance with the present invention, and the embodiment is formed on the same semiconductor substrate using a CMOS process or the like. Reference numeral 101 denotes an AF sensor circuit block for performing focus detection, reference numeral 102 denotes an analog circuit block, and reference numeral 103 denotes a digital circuit block. Each of the pixels of area sensors 104, 105, 106 and 107 has a photoelectric conversion element such as a photo diode, and an imaging region for capturing an image of an object is formed by arranging these pixels in a two dimensional manner. Imaging regions of the pair mentioned above in which the pixels are arranged in a two dimensional manner perform focus detection of an image formed optically at the position which is located at the center between the sensors of the pair, for each pair of line sensors in the regions. Therefore, the present invention can perform focus detection of a plurality of points. Because the phase difference detection type AF sensor performs focus detection by detecting a phase difference between two objects, imaging regions including an A image (standard portion) and a B image (reference portion) are required. The B image of the area sensor 1' 105 is placed symmetrically to the A image of the area sensor 1 104 relative to a vertical line which passes through an optical center 114. The B image of the area sensor 2' 107 is also placed symmetrically to the A image of the area sensor 2 106 relative to a horizontal line which passes through the optical center 114. The respective pixels of the area sensor 1 and the area sensor 1' are arranged in an array of 249 pixels×18 rows, but the pixels in the 16 rows in the array have the same pixel size of 13 um×93 um. In the area sensor 1 and the area sensor 1', two rows being in contact with the horizontal line which passes through the optical center 114 have the pixels having a larger photoreceiving area than other area. The size of each pixel in the two rows is about 13 um×140 um, and the pixel pitch in the lateral direction is made to be the same as that of other 16 rows. As a result, the pixels provided in the two rows being in contact with the horizontal line, which passes through the optical center 114, have about 1.5 times photo diode area compared to the pixel size in the other 16 rows.

In other words, the photoreceiving area of the pixels, which perform focus detection of the points being spatially located at the most central position among a plurality of focus detection points, will be made larger than others. Therefore, totally high precision autofocus can be provided by making the sensitivity of the most frequently used pixels higher than others.

The pixel size of the area sensor 2 and the pixel size of the area sensor 2' are the same and are about 13 um×69 um. These pixels are arranged in an array of 149 pixels×42 columns. In the present embodiment, pixel sizes of all pixels in the area sensor 2 and the area sensor 2' are made to be the same. However, as in the area sensor 1 and the area sensor 1', the pixel rows may be used in which the photoreceiving area of the pixels in the two columns being in contact with the vertical line which passes through the optical center 114 is increased.

In addition, reference numeral 108 in the analog circuit block denotes an AGC circuit for automatically controlling the gain of a signal output circuit based on an accumulation period of the AF sensor. Reference numeral 109 denotes a signal amplifying circuit for amplifying a photoelectric conversion signal of the AF sensor to output. Further, reference numeral 110 denotes a power supply circuit for generating a reference voltage required to drive the sensor. Reference numeral 115 denotes a digital analog converter for externally setting accumulation cutoff voltage, and reference numeral 116 is a thermometer circuit for measuring the temperature of the chip. Furthermore, reference numeral 111 in the digital circuit block denotes a SRAM for holding the accumulation information, a gain setting value and the like of the AF sensor, and reference numeral 112 denotes a multiplexer circuit for selecting an analog signal to output for monitoring. Furthermore, reference numeral 113 denotes a timing generator and I/Os.

Because the AF sensor circuit block 101 performs phase difference detection type autofocus, for example a pair of area sensor blocks such as the area sensor 1 (A image) and the area sensor 1' (B image) are arranged. Each of the area sensors is provided with an image forming lens thereon, and an object image is formed on each area sensor. The distance to the object can be calculated based on imaging positions on the area sensors, focal length of the image forming lenses and the spacing between the imaging forming lenses (base length).

In the present embodiment, the sensitivity is also improved by approximately 1.5 times by increasing the photoreceiving area of pixels in the two central rows of the area sensor 1 and the area sensor 1' arranged laterally by approximately 1.5 times. Thus, the autofocus performance in the central rows under the low intensity condition is improved. Also, since the chip area is maintained to the substantially same magnitude as the conventional one, the low cost implementation can be achieved. In addition, by making the lateral pixel pitch thereof to be the same as that of other row's pixels, relative precision of the output signal to that of the other rows can be made good, and the high precision autofocus sensor has been provided.

Second Embodiment

Figure 3:
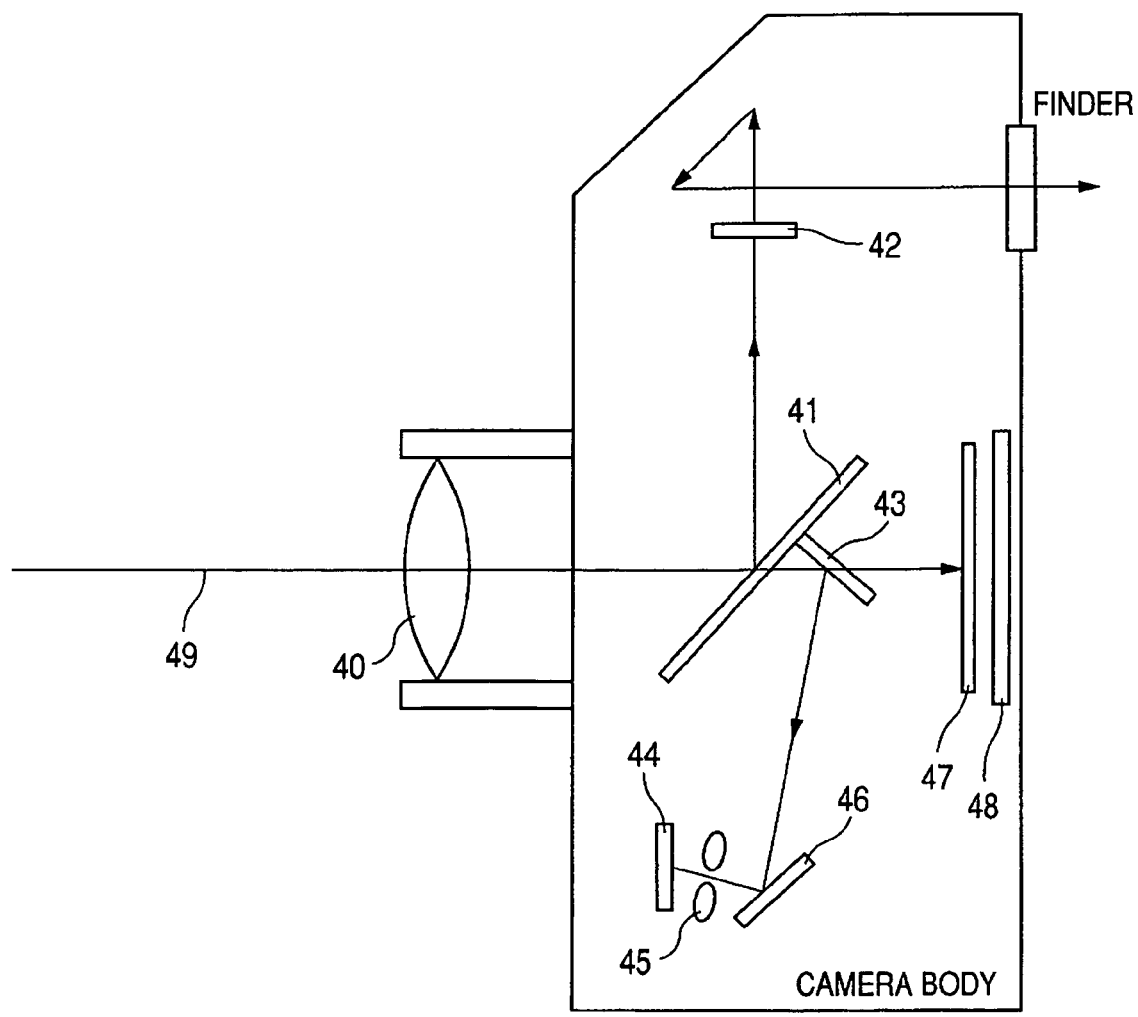
FIG. 3 is an exemplary diagram showing a second embodiment in accordance with the present invention.

FIG. 3 shows a schematic diagram of an optical system of a single lens reflex camera, in which a TTL-SIR (Through the Lens-secondary image forming phase difference detection) type autofocus system using the present invention is embedded. In FIG. 3, reference numeral 40 denotes a taking lens for temporally forming an image of an object on a film or on an image sensor. Reference numeral 41 denotes a quick turn mirror for reflecting light to a finder screen 42, which mirror is a half mirror transmitting several tens of percent of the light. Reference numeral 43 denotes a sub mirror for leading light to the AF system, and reference numeral 44 denotes a focus detecting device in accordance with the present invention. Reference numeral 45 denotes a secondary image forming lens for forming again an image of the object on an AF sensor, and reference numeral 46 is a reflecting mirror leading light to the AF sensor 44. In addition, reference numeral 47 denotes a focal plane shutter, reference numeral 48 denotes a film or an image sensor, and reference numeral 49 denotes a principal axis of a light beam.

In the present embodiment, by using the focus detecting device described in the first embodiment, lower intensity limitations than those of the conventional device are achieved, and low cost implementation of the single lens reflex camera can be provided.

If the present example corresponds to a TTL-SIR type AF camera regardless of whether it is an analog camera or a digital camera, it is apparent that the present invention can be applied thereto.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-251656, filed Aug. 31, 2005, which is hereby incorporated by reference herein in its entirety.

What is claimed is:

1. A phase difference detection type focus detecting device comprising:
   a first sensor group having a plurality of photoelectric conversion elements, the first sensor group functioning as a standard portion for phase difference detection;
   a second sensor group having a plurality of photoelectric conversion elements, the second sensor group being paired with the first sensor group and functioning as a reference portion for phase difference detection;
   a third sensor group having a plurality of photoelectric conversion elements, the third sensor group functioning as a standard portion for phase difference detection; and
   a fourth sensor group having a plurality of photoelectric conversion elements, the fourth sensor group being paired with the third sensor group and functioning as a reference portion for phase difference detection,
   wherein each photoreceiving area of the third and fourth sensor groups is larger than each photoreceiving area of the first and second sensor groups.

2. The focus detecting device according to claim 1, wherein the plurality of photoelectric conversion elements in the third and fourth sensor groups are arranged in a column manner or in a row manner.

3. The focus detecting device according to claim 2, wherein the photoelectric conversion elements of the third and fourth sensor groups have the same pitch as that of other photoelectric conversion elements in the each sensor group in a direction in which the paired sensor groups are arranged.

4. The focus detecting device according to claim 2, wherein a photoelectric conversion element for performing focal point detection of a relevant focal point which is spatially located at the most central position among a plurality of focal points corresponds to the photoelectric conversion elements in the third and fourth sensor groups.

5. A camera system comprising the focus detecting device according to claim 1.

* * * * *